Patented Oct. 15, 1935

2,017,440

UNITED STATES PATENT OFFICE 2,017,440

PURIFICATION OF HYDROGEN PEROXIDE

Alfred T. Hawkinson, Niagara Falls, N. Y., assignor to The E. I. du Pont de Nemours & Company, Incorporated, Wilmington, Del., a corporation of Delaware No Drawing. Application April 19, 1933, Serial No. 666,929

14 Claims. (Cl. 23—207)

This invention relates to the purification of aqueous solutions of hydrogen peroxide, and more particularly to the removal from such solutions of catalytic impurities which tend to promote hydrogen peroxide decomposition.

It is well known that the stability of hydrogen peroxide solutions depends in a large degree upon their purity. Certain impurities, such as oxides or salts of heavy metals, which may be present in solution or in suspension in hydrogen peroxide solutions, act catalytically to cause peroxide decomposition.

It has been discovered that such catalytic impurities may be substantially removed from hydrogen peroxide solutions by precipitating stannic hydroxide therein, whereby the impurities are caused to be precipitated or to adhere to the hydroxide precipitate. This has been accomplished by adding a suitable tin salt or an alkali metal stannate to the peroxide solution, adjusting the acidity of the solution to precipitate stannic hydroxide, and removing the precipitate by decantation or filtration. There are, however, certain disadvantages connected with this method of forming the stannic hydroxide precipitate. By the use of either tin salts or metal stannates, additional salts are introduced into the peroxide solution. If, for example, a metal stannate such as sodium stannate is used, sodium salts will remain in solution and the resulting purified hydrogen peroxide solution will have a correspondingly increased nonvolatile matter content, which is sometimes undesirable. Furthermore, since tin salts e. g., chlorides or sulfates, have a strongly acid reaction, and metal stannates have an alkaline reaction, the use of either one of these types of compounds as purifying agents may cause an appreciable change in the hydrogen ion concentration of the solution being treated. This effect is disadvantageous when it is desired to keep the hydrogen ion concentration within a limited range.

An object of this invention is to provide a method of purification for hydrogen peroxide solutions whereby catalytic impurities may be removed without introducing any appreciable amounts of non-volatile matter or other undesirable substances. A further object is to accomplish such purification without substantially altering the hydrogen ion concentration of the solution treated. Other objects will appear hereinafter.

I have discovered that, by adding a colloidal stannic oxide sol to a slightly acid hydrogen peroxide solution, stannic hydroxide may be precipitated therein, whereby substantially the same purifying action takes place as when a soluble tin compound is used. The stannic oxide sol may be prepared by the methods usually employed for the preparation of colloidal sols of this kind, for example, by peptizing freshly precipitated stannic hydroxide with a small amount of an alkaline substance.

In general, the amount of alkaline material present in the stannic oxide sol will be relatively small; and the addition of the required amount of the sol to the hydrogen peroxide will not materially affect the pH of the latter. For instance, in the following example, the amount of ammonia in the sol was so small that the colorimetric test showed no measurable change in the pH of the hydrogen peroxide after adding the sol thereto. In some cases, however, the sol might be sufficiently alkaline to cause a slight change in the pH of the peroxide. However, in all cases, such pH change will be materially smaller than that caused by the addition of equivalent amounts of a metal stannate, e. g., sodium stannate.

In carrying out my invention, the best results are obtained if the acidity of the hydrogen peroxide solution is within certain limits at the time of precipitation; for example, in the range of relatively high acidity, corresponding to pH values of 1.4 or less, the amount of impurities removed by the precipitate is considerably diminished. On the other hand, with lower acidities corresponding to pH values above 3.5, the precipitation of stannic hydroxide may be more or less incomplete and the non-volatile matter in the purified solution will be correspondingly greater. In general, I prefer to carry out the precipitation in solutions having a pH range of 2.2 to 3.4. The pH of the solution may be adjusted either before or after the addition of the stannic oxide sol. I prefer to adjust the pH to the desired range before adding the sol or to add the sol to a hydrogen-peroxide solution having a pH above 3.5, and then acidify to the desired pH value. In general, catalytic impurities will be removed to a somewhat smaller extent if the sol is added to a solution more acidic than the desired pH and then adjusted by adding a base. If it is necessary to reduce the acidity of the peroxide solution, either before or after adding the sol, I prefer to use a volatile base, e. g., ammonium hydroxide, in order to avoid the introduction of non-volatile matter.

After the addition of the stannic oxide sol, the precipitated stannic hydroxide may be removed by filtration or decantation and, if desired, a stabilizer may be added to prevent decomposition resulting from subsequent contamination with catalytic impurities. The precipitated stannic hydroxide precipitates or adsorbs the catalytic impurities and thus removes them from the solution. If desired, the precipitate may be left in contact with the solution, since neither it nor the impurities will re-enter the solution to any substantial extent, provided that the acidity of the solution remains unchanged. However, I prefer to remove the precipitate together with the impurities held by it, since the presence of insoluble material is objectionable for many uses of hydrogen peroxide.

The pH values mentioned above and hereinafter are those determined by the LaMotte colorimetric pH indicators.

By way of example, one method of carrying out my invention will be described.

Example

A colloidal sol of stannic oxide was prepared according to the following procedure:

To 150 grams of "C. P." $Na_2SnO_3.3H_2O$ dissolved in 7.5 liters of distilled water is added 225 cubic centimeters of 5 normal sulfuric acid. The gelatinous precipitate is filtered off, washed with distilled water and filtered again. The resultant gel is transferred to a flask, and 500 cubic centimeters of distilled water and 7 cubic centimeters of 15 normal ammonia solution (specific gravity 0.905) are added. The mixture is then allowed to stand for twenty-four hours to complete the peptization. If the gel is not completely peptized, more of the ammonia solution (not over 3 cubic centimeters) is added and the mixture allowed to stand until an opalescent but transparent sol is formed. The sol is then analyzed for $SnO_2$ content by evaporating a weighed sample to dryness.

A portion of a stannic oxide sol prepared as above was added to an impure 100-volume hydrogen peroxide solution, the precipitated stannic hydroxide was filtered off, and the stability and the non-volatile matter content of the purified solution were determined. Another sample of the impure peroxide solution was treated in the same manner with an equivalent amount of sodium stannate solution. The pH values of the two peroxide solutions were adjusted before treatment to give purified solutions of the same pH value in both cases. The comparative results obtained by the two methods of purification are shown in the following table:

|  | Purification with stannic oxide sol equivalent to 0.3 grams $SnO_2$ per liter of peroxide solution | Purification with sodium stannate solution equivalent to 0.3 grams $SnO_2$ per liter of peroxide solution |
| --- | --- | --- |
| pH before purification | 2.6 | 2.1 |
| pH after purification | 2.6 | 2.6 |
| Non-volatile matter | 0.1 gram/liter. | 0.4 gram/liter. |
| Stability (loss in volume concentration in 30 days at 32° C.) | 0.1 volume. | 0.1 volume. |

The results obtained in the above example indicate that the two methods of purification produce solutions of equal stability, but the stannic oxide sol purification yields a product which contains much less non-volatile matter than that obtainable with sodium stannate purification.

For purifying various hydrogen peroxide solutions, amounts of stannic oxide sol equivalent to 0.1 to 1.2 grams of $SnO_2$ per liter of peroxide solution have been used with good results; but these amounts are not critical and may be varied widely according to the nature and the amount of the impurities to be eliminated. In general, the minimum amount of sol used will depend upon the degree of purification required, while the maximum amount will be limited by the permissible dilution of the hydrogen peroxide solution.

I have described in considerable detail one method of preparing a colloidal sol of stannic oxide. It is to be understood, however, that the scope of my invention is not limited to any specified method of preparing the sol. If desired, the peptization of the sol may be accomplished with reagents other than ammonia solution. For example, if an alkali metal hydroxide is used as a peptizing agent, the non-volatile matter in the purified peroxide solution will be slightly greater than when ammonia is used, but will still be considerably less than would be the case if a metal stannate were used for the purification.

By means of my invention, it is now possible to remove catalytic impurities from hydrogen peroxide solutions without introducing new impurities therein. The hydrogen peroxide solutions thus purified are highly stable and contain a minimum of non-volatile matter and other impurities. The fact that my purification process does not substantially alter the acidity of the solution during treatment, simplifies its use and renders it ideally suitable for commercial application.

I claim:

1. A process for the purification of a hydrogen peroxide solution comprising adding thereto under conditions which will result in the precipitation of stannic hydroxide, a colloidal sol of stannic oxide to precipitate stannic hydroxide therein.

2. A process for the purification of a hydrogen peroxide solution comprising adding thereto under conditions which will result in the precipitation of stannic hydroxide, a colloidal sol of stannic oxide to precipitate stannic hydroxide therein and thereafter removing from said solution the precipitated stannic hydroxide together with the impurities associated therewith.

3. A process for the purification of a hydrogen peroxide solution comprising adjusting the acidity of said solution to a pH value of 1.4 to 3.5 and adding thereto a colloidal sol of stannic oxide to precipitate stannic hydroxide therein.

4. A process for the purification of a hydrogen peroxide solution comprising adjusting the acidity of said solution to a pH value of 1.4 to 3.5, adding thereto a colloidal sol of stannic oxide to precipitate stannic hydroxide therein and thereafter removing from said solution the precipitated stannic hydroxide together with the impurities associated therewith.

5. A process for the purification of a hydrogen peroxide solution comprising adjusting the acidity of said solution to a pH value of 2.2 to 3.4 and adding thereto a colloidal sol of stannic oxide to precipitate stannic hydroxide therein.

6. A process for the purification of a hydrogen peroxide solution comprising adjusting the acidity of said solution to a pH value of 2.2 to 3.4, adding thereto a colloidal sol of stannic oxide to precipitate stannic hydroxide therein and thereafter removing from said solution the precipitated stannic hydroxide together with the impurities associated therewith.

7. A process for the purification of a hydrogen peroxide solution comprising adding thereto under conditions which will result in the precipitation of stannic hydroxide, an alkaline solution containing stannic oxide in colloidal solution to precipitate stannic hydroxide therein.

8. A process for the purification of a hydrogen peroxide solution comprising adding thereto a colloidal sol of stannic oxide and adjusting the acidity of said solution to cause the precipitation of stannic hydroxide.

9. A process for the purification of a hydrogen peroxide solution comprising adding thereto a colloidal sol of stannic oxide and adjusting the acidity of said solution to a pH value of 1.4 to 3.5 to cause the precipitation of stannic hydroxide.

10. A process for the purification of a hydrogen peroxide solution comprising adjusting the acidity of said solution to a pH value of 1.4 to 3.5 and adding thereto an aqueous solution of ammonia containing stannic oxide in colloidal solution to precipitate stannic hydroxide therein and thereafter removing from said solution the precipitated stannic hydroxide together with the impurities associated therewith.

11. A process for the purification of a hydrogen peroxide solution comprising adjusting the acidity of said solution to a pH value of 1.4 to 3.5, adding thereto a solution of sodium hydroxide containing stannic oxide in colloidal solution to precipitate stannic hydroxide therein and thereafter removing from said solution the precipitated stannic hydroxide together with the impurities associated therewith.

12. A process for the purification of a hydrogen peroxide solution comprising adding thereto an aqueous solution of ammonia containing stannic oxide in colloidal solution, adjusting the acidity of said solution to a pH value of 1.4 to 3.5 to cause the precipitation of stannic hydroxide and thereafter removing from said solution the precipitated stannic hydroxide together with the impurities associated therewith.

13. A process for the purification of a hydrogen peroxide solution comprising adding thereto under conditions which will result in the precipitation of stannic hydroxide, a stannic oxide sol to precipitate stannic hydroxide therein, said stannic oxide sol being substantially free from non-volatile substances which are soluble in said hydrogen peroxide solution.

14. A process for the purification of a hydrogen peroxide solution comprising adjusting the acidity of said solution to a pH value of 1.4 to 3.5, adding thereto a stannic oxide sol to precipitate stannic hydroxide therein, said stannic oxide sol being substantially free from non-volatile substances which are soluble in said hydrogen peroxide solution and thereafter removing from said solution the precipitated stannic hydroxide together with the impurities associated therewith.

ALFRED T. HAWKINSON.